United States Patent [19]
Gupta et al.

[11] Patent Number: 4,903,217
[45] Date of Patent: Feb. 20, 1990

[54] FRAME BUFFER ARCHITECTURE CAPABLE OF ACCESSING A PIXEL ALIGNED M BY N ARRAY OF PIXELS ON THE SCREEN OF AN ATTACHED MONITOR

[75] Inventors: Satish Gupta, Peekskill, N.Y.; Leon Lumelsky, Stamford, Conn.; Marc Segre, Rhinebeck, N.Y.

[73] Assignee: International Business Machines Corp., Armonk, N.Y.

[21] Appl. No.: 13,843

[22] Filed: Feb. 12, 1987

[51] Int. Cl.[4] .............................................. G06F 12/00

[52] U.S. Cl. .................................... 364/521; 364/900; 364/926.1; 364/927.4; 364/939.3; 364/957.5

[58] Field of Search ............... 340/747, 789, 799, 798, 340/802, 803, 804; 364/521, 200 MS File, 900 MS File

[56] References Cited

U.S. PATENT DOCUMENTS

| | | | |
|---|---|---|---|
| 4,434,502 | 2/1984 | Arakawa et al. | 382/41 |
| 4,442,503 | 4/1984 | Schutt et al. | 364/900 |
| 4,475,104 | 10/1984 | Shen | 340/729 |
| 4,509,043 | 4/1985 | Mossaides | 340/721 |
| 4,648,049 | 3/1987 | Dines et al. | 364/521 |
| 4,663,735 | 5/1987 | Novak et al. | 364/900 |
| 4,691,295 | 9/1987 | Erwin et al. | 340/798 X |
| 4,779,223 | 10/1988 | Asai et al. | 364/900 |

*Primary Examiner*—Gary V. Harkcom
*Assistant Examiner*—Mark K. Zimmerman
*Attorney, Agent, or Firm*—Roy R. Schlemmer, Jr.

[57] ABSTRACT

A frame buffer memory organization which is capable of accessing a pixel aligned M by N array of contiguous pixels on the screen from a frame buffer memory constructed of an M by N array of memory chips by driving a common address bus to all the memory chips, and by driving N RAS wires horizontally across the memory chip array and M CAS wires vertically down the memory chip array. The writing of individual pixels in this array is enabled by energizing the write enable pins to each memory chip directly.

The data wires in the memory organization are tied together such that M horizontal pixels in a single row can be read or written simultaneously. Additionally, all M and N pixels may be written simultaneously if the data in all vertical columns is the same.

The frame buffer includes a selectively energizable plane mask for disabling desired planes of accessed pixels.

By sequentially controlling the output enables to the different rows of the addressed M by N array, the frame buffer can provide rapid access to N-1 rows after normally accessing the first one.

The described architecture will work equally well for M by N other array organizations with a different size (e.g., 8 by 8, 3 by 4, 5 by 4, etc). These other configurations would of course require as many concurrently accessable memory chips or sections as there are pixels in the accessed rectangular array as will be well understood.

2 Claims, 11 Drawing Sheets

FIG. 5.1
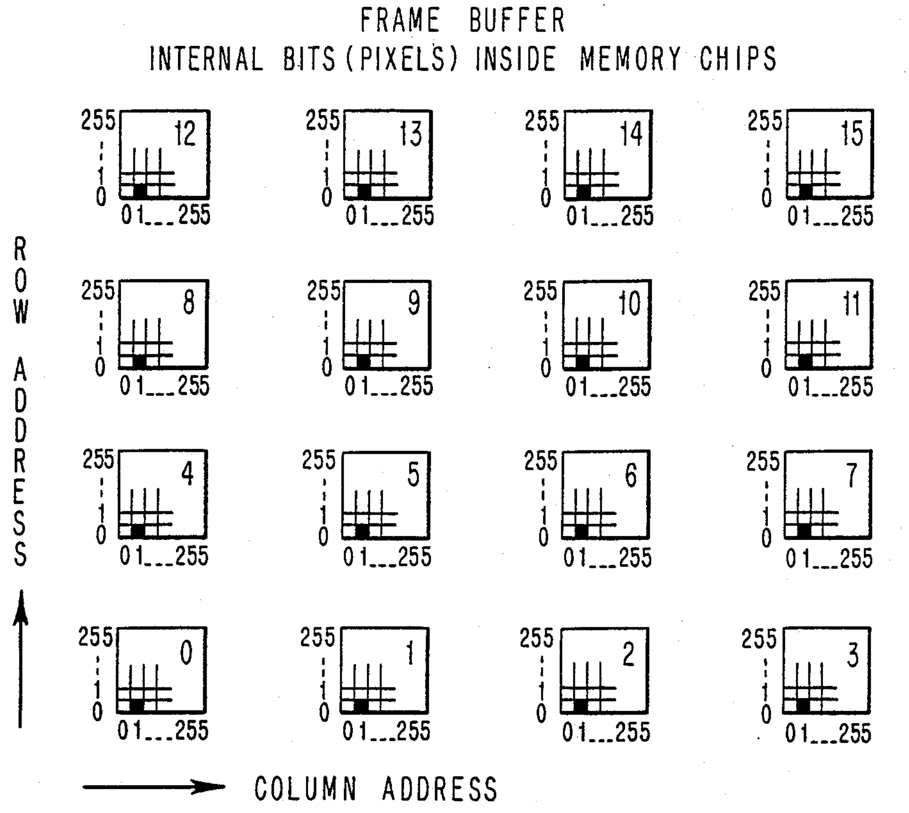
FIG. 5.2
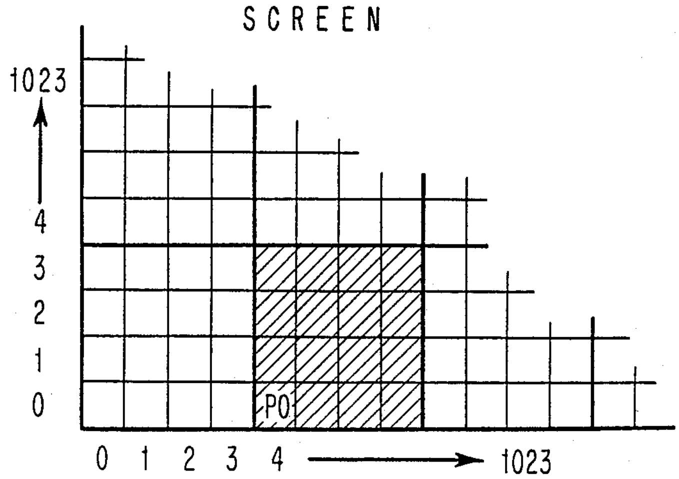

FIG. 6.1
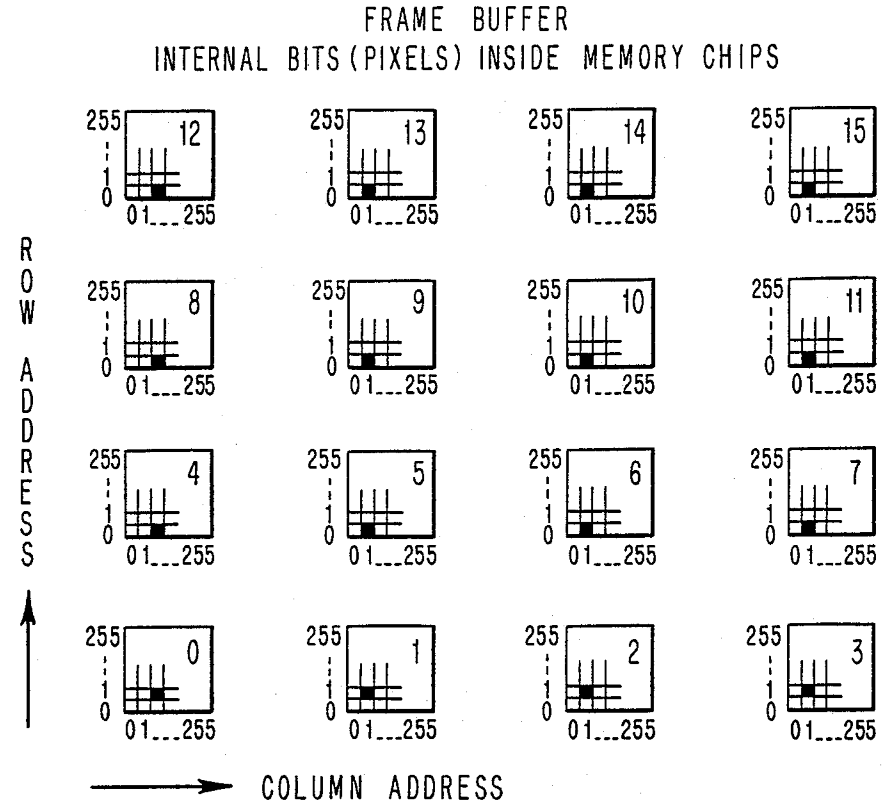
FIG. 6.2
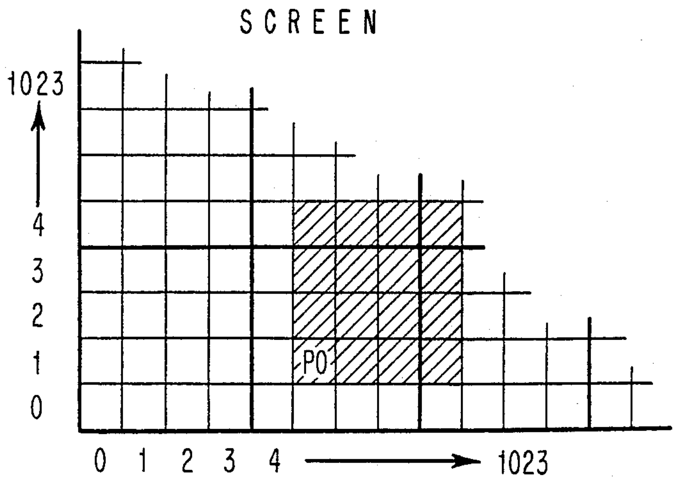

| CONTROL | OUTPUTS | | | |
|---|---|---|---|---|
| X (1,0) | CAS1 | CAS2 | CAS3 | CAS4 |
| 0,0 | CASA | CASA | CASA | CASA |
| 0,1 | CASB | CASA | CASA | CASA |
| 1,0 | CASB | CASB | CASA | CASA |
| 1,1 | CASB | CASB | CASB | CASA |

FRAME BUFFER ARCHITECTURE CAPABLE OF ACCESSING A PIXEL ALIGNED M BY N ARRAY OF PIXELS ON THE SCREEN OF AN ATTACHED MONITOR

CROSS REFERENCE TO RELATED COPENDING APPLICATIONS

U.S. patent application Ser. No. 07/013,842, filed Feb. 12, 1987, now U.S. Pat. No. 4,870,406, entitled "A HIGH RESOLUTION GRAPHICS DISPLAY ADAPTER" relates to an overall high function video display adapter, in which the architecture of the present invention has particular utility.

U.S. patent application Ser. No. 07/013,848, now U.S. Pat. No. 4,816,814, filed Feb. 12, 1987, entitled "VECTOR GENERATOR WITH DIRECTION INDEPENDENT DRAWING SPEED FOR AN ALL-POINT ADDRESSABLE RASTER DISPLAY" discloses a novel vector line drawing circuit for use with raster scan type video displays and having both improved speed and versatility of function.

U.S. patent application Ser. No. 07/013,840, now U.S. Pat. No. 4,808,986, filed Feb. 12, 1987, entitled, "A GRAPHICS DISPLAY SYSTEM WITH MEMORY ARRAY ACCESS" discloses circuitry for performing functions in the "pixel processor" block of application Ser. No. 07/013,842. This application specifically relates to circuitry for controlling pixel data provided to the frame buffer of the video adapter and includes controllable write mask used in storing pixel data in the associated frame buffer.

U.S. patent application Ser. No. 07/013,849, filed Feb. 12, 1987, entitled "A GRAPHICS FUNCTION CONTROLLER FOR A HIGH PERFORMANCE VIDEO DISPLAY SYSTEM" discloses circuitry for performing line drawing and bit block transfer operations in the pixel processor block transfer operations in the "pixel processor" block of application Ser. No. 07/013,842.

U.S. patent application Ser. No. 07/013,841, now U.S. Pat. No. 4,837,563, filed Feb. 12, 1987, entitled "A GRAPHICS DISPLAY SYSTEM FUNCTION CIRCUIT" discloses a graphics function address counter circuit similar to that set forth in the above referenced U.S. patent application Ser. No. 07/013,848, which is uniquely suited to the overall video display adapter architecture set forth in the above referenced application Ser. No. 07/013,842.

U.S. patent application Ser. No. 07/013,847 now U.S. Pat. No. 4,823,286, entitled "PIXEL DATA PATH FOR HIGH PERFORMANCE RASTER DISPLAYS WITH ALL-POINT ADDRESSABLE FRAME BUFFERS" discloses a channel architecture which could be utilized in the pixel data path feeding the frame buffer of such an adapter and which enables a number of versatile pixel data operations within the frame buffer. The hardware of this application would be located within "pixel processor" block of application Ser. No. 07/013,842.

FIELD OF THE INVENTION

The present invention relates generally to the field of display adapters for interfacing between a computer and an attached raster scan video display monitor. It relates more specifically to such an adapter which provides many functions previously unavailable in stand alone workstations.

The invention relates still more specifically to the memory architecture and controls for the frame buffer of such a video adapter.

BACKGROUND OF THE INVENTION

As the speed and file capacity of workstations and personal computers increases, the demand for high resolution intelligent display adapters also increases. Large graphic applications formerly limited to mainframe computers having dedicated graphic display terminals can use this increased capability to migrate their graphic applications to stand alone systems. The present invention describes functions that can be incorporated into a video display adapter to provide, in stand alone work stations, the graphic functions and performance required by such complex graphic applications.

Such increased capability display adapters are especially needed for such small stand alone systems as the IBM PC/AT and the IBM RT-PC which can provide high-performance, moderate-cost adapter functions which cover a very broad spectrum of applications.

The memory organization of the frame buffer is a limiting factor to the update performance of frame buffered raster scan displays. The memory organization determines how many and which pixels can be accessed in a single memory cycle, and hence limits the number of pixels that can be updated in parallel by the update hardware. High performance displays frequently allow parallel update to the frame buffer effectively resulting in a lower memory cycle time per pixel.

The parallel update required is dependent upon the size and shape of the objects being drawn into the frame buffer. Hence, if the only objects being drawn were long horizontal lines, an organization which allowed the parallel access of sixteen or thirty-two horizontal pixels would be ideal. Similarly, if the only objects displayed were six by eight characters, then a memory organization that allowed the parallel access of a six by eight array of pixels would be perfect.

An added benefit to frame buffer memory organizations is the ability to access these arrays of pixels at any arbitrary pixel boundary. If the above example of the parallel access of sixteen horizontal pixels limits the location of the left edge to be on a sixteen pixel boundary, then the horizontal line drawer would find its maximum efficiency only if the line started on sixteen pixel boundaries, an unlikely case. Access to sixteen pixels whose left edge can be at any desired pixel boundary is more efficient. In the present description, this type of parallel access will be called "pixel aligned" access.

The implementation of memory organizations determines the cost and complexity of frame buffered systems and their associated update hardware. The memory organization and its implementation hence becomes critical in determining the cost and functionality of frame buffered displays. Because of the nature of memory chips, the complexity of the frame buffer organization is uniquely determined by the number of memory chips and the number of unique signal wires connected to them. These memory wires consist of the address wires (usually multiplexed into row address and column address signals), data wires and control signals (row address strobes, column address strobes, and the write enables).

U.S. Pat. No. 4,435,792 of A. Bechtolsheim issued Mar. 6, 1984 and entitled "RASTER MEMORY MA- NIPULATION APPARATUS" provides a frame buffer organization which allows the access of sixteen pixel aligned horizontal pixels. This is achieved by using sixteen memory chips (64 kilobits each) to realize a 1K by 1K frame buffer. The ability to access a pixel aligned word is achieved by strobing column addresses to different chips depending upon the left boundary of the desired word. The implementation uses one address bus, but sixteen column address strobe wires. The first address is driven and the appropriate chips strobed, followed by the second address and the strobe of the rest of the chips. This implementation requires a longer memory cycle but only eight address signals.

An article by Robert F. Sproull, Ivan E. Sutherland, Alistair Thompson, Satish Gupta, and Charles Minter, entitled "THE EIGHT BY EIGHT DISPLAY", ACM Transactions on Graphics, Vol. 2, No. 1, Jan. 1983, pp. 32–56 describes the implementation of the access to an eight by eight array of pixels that could be pixel aligned to optimize the access for different operations. The eight by eight display had eight sets of addresses (eight wires each) which could deliver different addresses to different columns of the eight by eight array of memory chips. The memory organization used provided separate row addresses by using the same address wires and providing different column strobes, and provided separate column addresses by driving different addresses on different columns.

The Eight by Eight Display could read or write all 64 pixels. Hence, an eight bits per pixel frame buffer would use five hundred and twelve (64×8) bits of data. Obviously, such a large number of bits can be processed only by an array of processors, or require additional multiplexers, which would reduce the number of bits read from the frame buffer to the size of the data bus. In a single process system such a large number of I/O and address lines is too large to be acceptable. The present invention describes a frame buffer memory organization, which has a reduced number of address, data, and control wires, but still allows full pixel aligned addressability to the frame buffer.

PRIOR ART

In addition to the patent and publication discussed in detail in the Background of Invention section the following patents constitute the art known to the inventors which is most relevant to the present invention.

U.S. Pat. No. 4,434,502 of Arakawa et al entitled "A MEMORY SYSTEM HANDLING A PLURALITY OF BITS AS A UNIT TO BE PROCESSED" describes a pixel aligned memory access, but only for read operations. The present invention, conversely, provides all-point addressability for both read and write operations. In U.S. Pat. No. 4,434,502 the general idea of the memory organization is based on separating or breaking the memory into a number of smaller blocks (at least four) and providing different address control for each of them. The present invention however, utilizes a different approach to address control. The present invention utilizes time separation or multiplexing of the addresses for various sections of memory rather than space separation as in U.S. Pat. No. 4,434,502. Therefore, the frame buffer of the present invention may be considered as a single physical block under a common address control.

The consequences of this approach are as follows. In U.S. Pat. No. 4,434,502 a number of arithmetic units are required for address incrementing/decrementing which is equal to the number of memory blocks. This of course makes a frame buffer more expensive because of extra hardware, e.g., a larger chip count. With the architecture of the present invention only one external address incrementor and one four-to-one address multiplexer are required.

Further, according to the teachings of the U.S. Pat. No. 4,434,502, the number of address busses must be twice the number of blocks in the frame buffer. This prevents the implementation of such an architecture in VLSI because of the large number of inputs and outputs required. In the present invention it is possible to implement an address control fully in VLSI technology, because only one address bus is required.

Another thing which may be presumed from the U.S. Pat. No. 4,434,502, but not specifically set forth is that the frame buffer is built from conventional static RAMs. The static RAMs usually have lower density than conventional dynamic RAMs. But they allow separate pairs of addresses to be applied to the memory blocks. If conventional dynamic RAMs (which have on-chip row/column address demultiplexers) rather than static RAMs were used in order to reduce the number of memory chips and the board space required for such a frame buffer, then an additional two-to-one address multiplexer would be required for each memory block. The present invention however, is not concerned with static RAMs because of the impracticability of using them for large frame buffers.

Finally, in the U.S. Pat. No. 4,434,502 the concept of reducing the size of the data bus is implemented by an additional logic selection unit, one for each block. In the present invention the number of data bus lines is greatly reduced without any additional hardware, while providing the same write operation performance obtainable as though the size of the data bus were not reduced.

In summary, the overall method and apparatus described in U.S. Pat. No. 4,434,502 requires a larger amount of additional control hardware chips, than would probably make up the memory itself. Conversely, the approach of the present invention makes the frame buffer control much less expensive and space consuming while providing the same or even higher performance.

U.S. Pat. No. 4,442,503 of D. Schutt et al entitled "DEVICE FOR STORING AND DISPLAYING GRAPHIC INFORMATION" describes a method of increasing the performance of a two dimensional vector (or curve) drawing in a frame buffer with linear organization. The disclosed frame buffer essentially comprises a conventional architecture, which provides a reasonable performance for storing rasterized images, but is slow for two-dimensional drawing.

The solution of this U.S. Pat. No. 4,442,503 is based on the same approach to the frame buffer design as in U.S. Pat. No. 4,434,502 i.e., it requires the frame buffer to be made up from a number of smaller modules. Consequently, the subject of U.S. Pat. No. 4,442,503, is an address transformation device, which converts two-dimensional arrays of addresses, e.g., for vector drawing, into separate addresses for each frame buffer module and distributes the addresses over the address inputs of each storage module. The number of storage modules is essentially equal to the vertical dimension of the vector strobe file.

The present invention on the other hand, essentially describes an organization and implementation of a two-dimensional frame buffer. Such a buffer can be successfully used for storing rasterized images, as well as for vector drawing without any need for extra address conversion and providing for the separate addressing of a number of memory modules.

U.S. Pat. No. 4,475,104 of T. Shen entitled "THREE DIMENSIONAL DISPLAY SYSTEM" describes what it refers to as a Z-buffer algorithm, which facilitates two-dimensional representation and storage of three-dimensional images. It does not however, concern itself with the frame buffer architecture, but rather, only with the methods of interpretation of data stored into the frame buffer. This is quite a different concern than the memory organization of the present invention.

U.S. Pat. No. 4,509,043 of P. Mossaides entitled "METHOD AND APPARATUS FOR DISPLAYING IMAGES" describes a method for using a conventional video-look-up-table for the superimposing of images stored in the same frame buffer. The organization of the frame buffer itself has no bearing on this object and is unrelated to that of the present buffer architecture.

An article entitled "ALL POINTS-ADDRESSABLE RASTER DISPLAY MEMORY" of Dill et al appearing in the IBM Journal of Research and Development, Vol. 28, No. 4, July 1984 is pertinent to the present invention in that it describes a two-dimensional frame buffer architecture. The system described in the article does not require separation of the frame buffer into smaller memory modules with separate address busses, like the first two referenced patents discussed previously. Two architectures are described in this paper. However, both differ from the architecture disclosed in the present invention.

The first approach requires a separate address incrementor which is inside each memory chip. Unfortunately, such chips are not currently available. Moreover, it is hardly possible that one would trade off chips space for an additional incrementor, when it can be used for additional memory cells. Accordingly, such an approach has more theoretical than practical value.

The second approach disclosed in the article does not use special memory chips within an address incrementor, but instead, manipulates the memory input/output bits, selecting only the desired bits. This method requires twice the number of memory chips, compared with the frame buffer.

The approach utilized in the present invention is to have one address incrementor and to multiplex two-row and two-column addresses in time. Thus, each chip, even without an additional address multiplexer thereon, may get either an incremented or non-incremented row address as well as an incremented or non-incremented column address. Consequently, the present invention, offers an effective way of using conventional memory chips without any additional memory chips required. The number of memory chips required should be only enough to store a full image, e.g., the embodiment of the present invention describes a four by four buffer memory plane built with sixteen 64K by 8 bit memory chips. This number provides a full storage of a 1K by 1K 8-bit image. The approach, described in the paper would require two chips to provide an all-points addressability for a four by four square of pixels, or twice the storage capacity, than is required for basic image storage.

The system described in the above article differs further from that of the present invention, in that it does not discuss any reduction of the input/output data length except for what is required for pixel addressability if the second approach described in the paper were to be used. Generally, such a reduction is not sufficient in terms of the interface with the external microprocessor, graphic generator units, etc.. Conversely, the system of the present invention is concerned with just this problem.

U.S. Pat. No. 4,663,729 of Dill et al entitled "DISPLAY ARCHITECTURE HAVING VARIABLE DATA WIDTH" is directed to the internal architecture of dynamic memory chips and is concerned with providing a variety of screen formats data path widths. In particular, it provides a way of reducing the number of chips, which must be used when a requirement for a different format takes place, particularly when horizontal resolution is not a number which is a power of two.

This is a separate problem from that of the present invention and the solution of the problem does not influence nor facilitate the implementation of a high performance all-point addressable frame buffer as is the case with the present invention.

SUMMARY AND OBJECTS OF THE INVENTION

It is a primary object of the present invention to provide a frame buffer memory architecture capable of accessing a pixel aligned M by N array (on the screen) of pixels stored in a frame buffer memory.

It is a further object of the invention to provide such a frame buffer architecture wherein the desired access is obtained by driving a common address bus to all the memory chips.

It is a still further object of the invention to provide such a frame buffer architecture wherein M RAS wires are driven horizontally across the memory array and N CAS wires are driven vertically down the memory array.

It is another object of the invention to provide such a frame buffer architecture wherein all the data wires in the memory chips are tied together in columns.

It is another object of the invention to provide such a frame buffer architecture wherein extremely high speed clearing and moving of arbitrary rectangles is possible.

It is another object of the invention to provide such a frame buffer architecture wherein a plane mask may be selectively used to disable desired planes of pixels in the buffer.

It is another object of the invention to provide such a frame buffer architecture wherein means for sequentially controlling the output enables to different rows provides rapid access to successive rows of an array normally accessing the first row.

Other objects, features and advantages of the invention will be apparent from the following detailed description of the invention.

The present invention provides a frame buffer memory organization which is capable of accessing an arbitrarily aligned M by N array of a frame buffer memory by driving a common address bus to all the memory chips, and by driving N RAS wires horizontally across the memory array and M CAS wires vertically down the memory array (4 by 4 in the described embodiment).

This memory organization also allows the control of writing individual pixels in this array by controlling the write enable pins to each memory chip directly. The data wires in the memory organization are tied together such that only M horizontal pixels can be read or written. This leads to fewer data wires for the memory as well as fewer bits to compute. During reads, the output enables control which row is being read. During writes, the above mentioned write enables control which row is being written.

The frame buffer has a plane mask which may be selectively energized to disable desired planes of the pixels.

By sequentially controlling the output enables to different rows, the frame buffer can provide rapid access to 3 rows after normally accessing one. This allows the economy of a small data bus, as well as high speed for sequential updates.

In addition to the described technique for rapidly accessing successive rows of a 4 by 4 square, the memory organization can also provide for accessing the neighboring 4 by 4 squares in page mode. Page mode can only be used if these successive 4 by 4 squares have the same row address. This permits an access that is 2 to 4 times the normal memory access speed. Squares along a row are always on the same row address.

The described architecture will work equally well for other square organizations with a different size (e.g., 8 by 8, 16 by 16) or for other rectangular organizations with different sizes (e.g., 3 by 4, 5 by 4, etc.). These other configurations would of course require as many concurrently accessable memory chips or selections as there are pixels in the accessed rectangular array as will be well understood. Thus, for an 8 by 8 array, 64 sections; or for a 4 by 5 array, 20 sections would be required.

Compared to a conventional implementation of such a frame buffer, the present invention utilizes a reduced number of I/O and address lines, and considerably less memory assisting hardware. Consequently, such a frame buffer architecture delivers a lower cost display with the performance of significantly more expensive systems.

BRIEF DESCRIPTION OF THE DRAWINGS

FIG. 5.1 comprises a mapping in the frame buffer of a typical set of sixteen pixels of the aligned four by four pixel array on the screen as shown in FIG. 5.2.

FIG. 5.2 illustrates the location on the screen of a four by four pixel array "aligned" on word boundaries (non-aligned).

FIG. 6.1 comprises a mapping in the frame buffer of a typical set of sixteen pixels of a non-aligned four by four pixel array on the screen as shown in FIG. 6.2.

FIG. 6.2 illustrates the location on the screen of a four by four pixel array not "aligned" on precise word boundaries.

DESCRIPTION OF THE PREFERRED EMBODIMENT

Before proceeding with a detailed description of the present Frame Buffer Architecture capable of accessing pixel aligned square words of the screen, a brief overview will be presented of a video adapter in which the present invention has particular utility. It is of course to be understood that the herein described video adapter is intended to be for illustration only and that the present invention could be used advantageously with other video adapter architectures as will be apparent to those skilled in the art.

Figure 1:
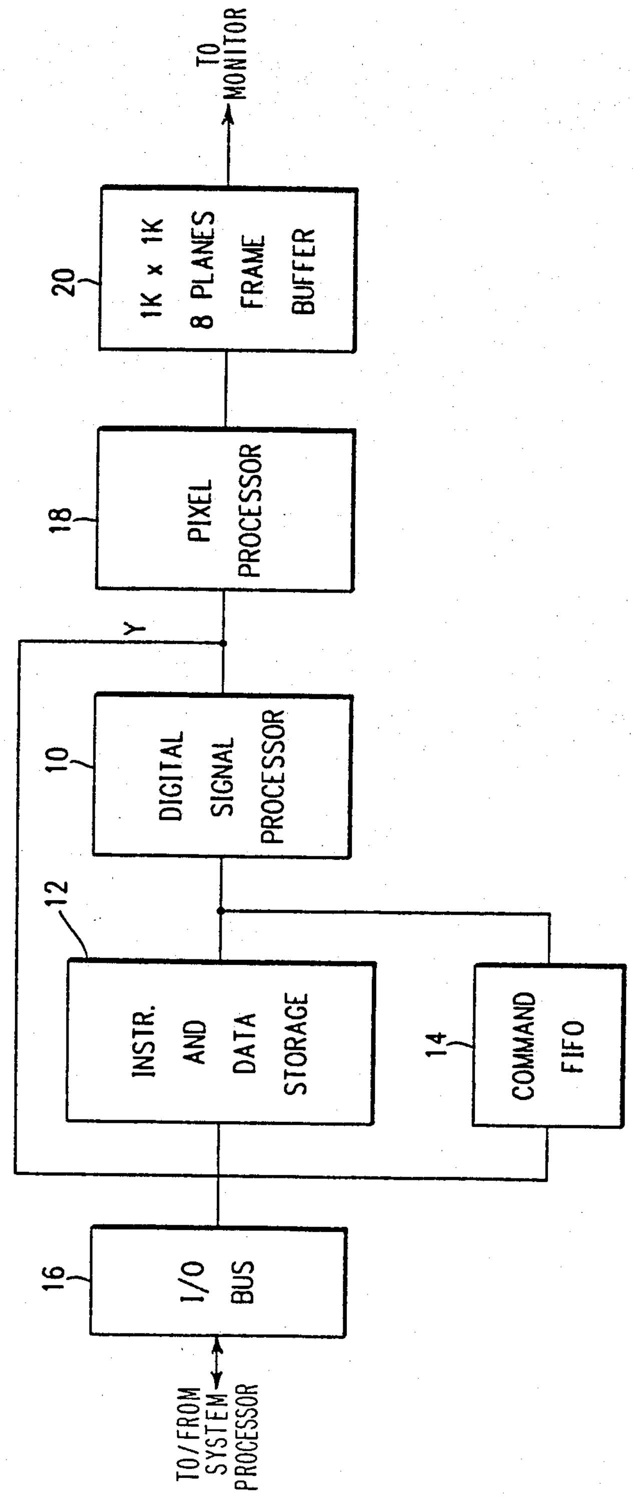
FIG. 1 comprises a high level functional block diagram of the architecture of an overall video adapter in which the present invention has particular utility.

An overall functional block diagram of a video display adapter in which the present invention has particular utility is shown in the FIG. 1.

The video display adapter is envisioned as a high resolution medium function graphics display adapter which could drive any of a number of currently available display monitor units such as the IBM 5081. In a currently realizable form, it will support such a monitor with a resolution of 1024 by 1024 pixels and provides eight bits per pixel of video data information which provides 256 possible control features which may be distributed between a larger number of colors.

The following comprises a brief description of the overall function of the adapter, it being understood that for a more detailed description of such an adapter, reference should be made to copending application Ser. No. 07/013,842. Since the primary objective of the overall video display adapter is to provide advanced video display functions in a comparatively inexpensive adapter which is in turn adapted to be connected to processors or CPU's having somewhat limited processing capability, those functions which would otherwise be performable in a more sophisticated CPU are provided in the present adapter functions. Further, the functions are implementable via a relatively straightforward and simplified set of instructions.

Referring to FIG. 1, the overall adapter consists of the following major components. The digital signal processor 10 is utilized to manage the overall adapter's resources, but it transforms display coordinates and performs a number of other fairly sophisticated signal processing tasks.

The instruction and data storage block 12 is an instruction RAM which can be loaded with additional micro code for the signal processor as will be understood. Block 12 also acts as a data RAM and provides the primary interface between signal processor 10 and the system processor. It also performs the function of being a main store for signal processor 10.

Block 14 labeled command FIFO serves as an input buffer for passing sequential commands to the digital signal processor 10. Via I/O bus 16 and, as is apparent, connects the video display adapter to the system processor.

The pixel processor 18 contains logic that performs a number of display supporting functions such as line drawing and address manipulation which permits finite areas of the display screen to be manipulated by bit-block transfer (BIT BLT). A number of the novel aspects of the present display adapter are resident in the pixel processor block.

Block 20 labeled frame buffer comprises the video random access memory which feeds the monitor through appropriate digital analog conversion circuitry. As is apparent, the configuration herein disclosed has a resolution of approximately 1K by 1K pels wherein each pixel represents a discrete element of video data played on the monitor which may contain as much information as is storable in the eight planes of the frame buffer which is as well understood means that there are eight bits of data per pixel. As will be further understood, these eight bits may be distributed among the red, green and blue of a color monitor or simply for intensity information in a gray scale black and white monitor.

The subject matter of the present invention is resident in the architecture of the frame buffer 20 and provides a number of features which permit the operation of the video adapter to be significantly speeded up as will be apparent from the subsequent description.

Proceeding now with the description of the present frame buffer architecture, the following description assumes a frame buffer with a 1K (1024) by 1K resolution by eight (bits of video data per pixel). All design parameters can be easily extended to frame buffers with different resolutions and a different number of bits per pixel. This frame buffer would probably be built using 16 memory chips, each having a capacity of 64K by 8 bits (e.g., 256 by 256 by 8), although it may be assembled by smaller chips (e.g., using two 64K by 4 chips, or eight 64K by 1 chips in place of each 64K by 8 bit chip).

Figure 2:
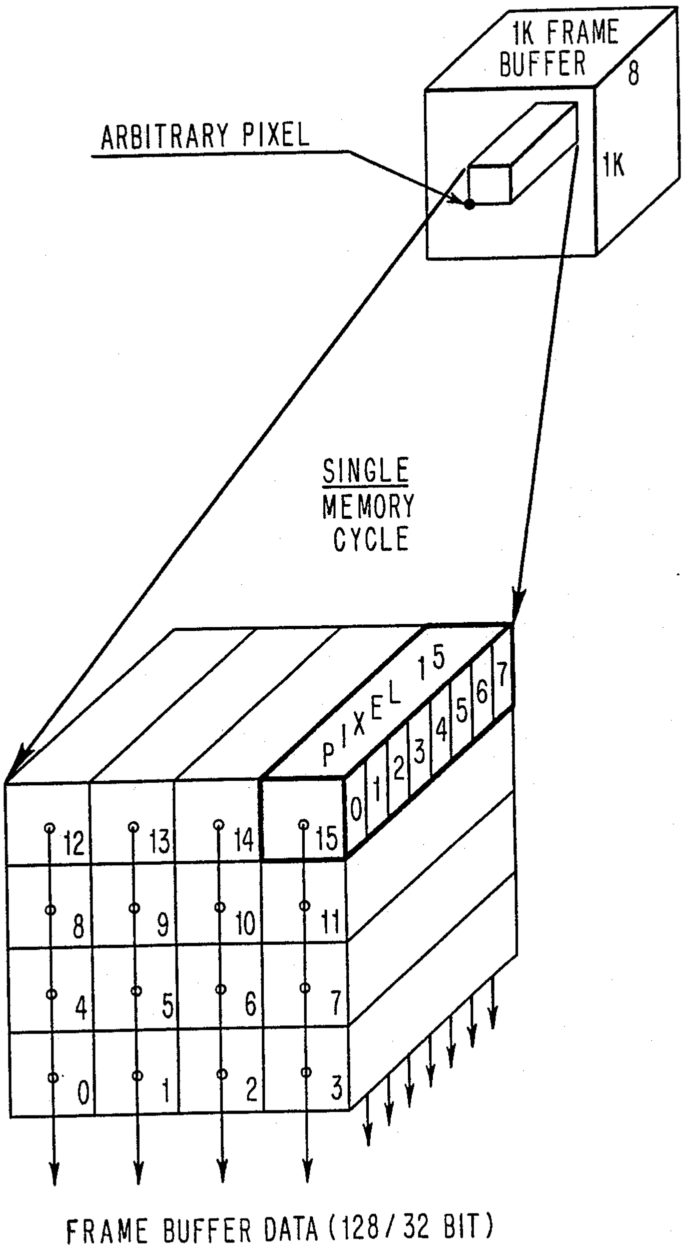
FIG. 2 is a diagrammatic drawing showing a 4 by 4 on the screen square pixel array illustrating the addressing of individual pixels and the eight bits of data comprising each pixel.

Hence, 16 pixels can be accessed in parallel, one pixel from each chip. These 16 pixels may be accessed as a 4 by 4 square as illustrated in the foreground of FIG. 2. In one memory cycle 128 bits of data can be accessed, that corresponds to 16 pixels, numbered from 0 to 15. It should be understood that the array is distributed throughout the frame buffer with one pixel of any array stored on a different chip or section of the buffer. This will be more apparent from the following description.

Figure 3:
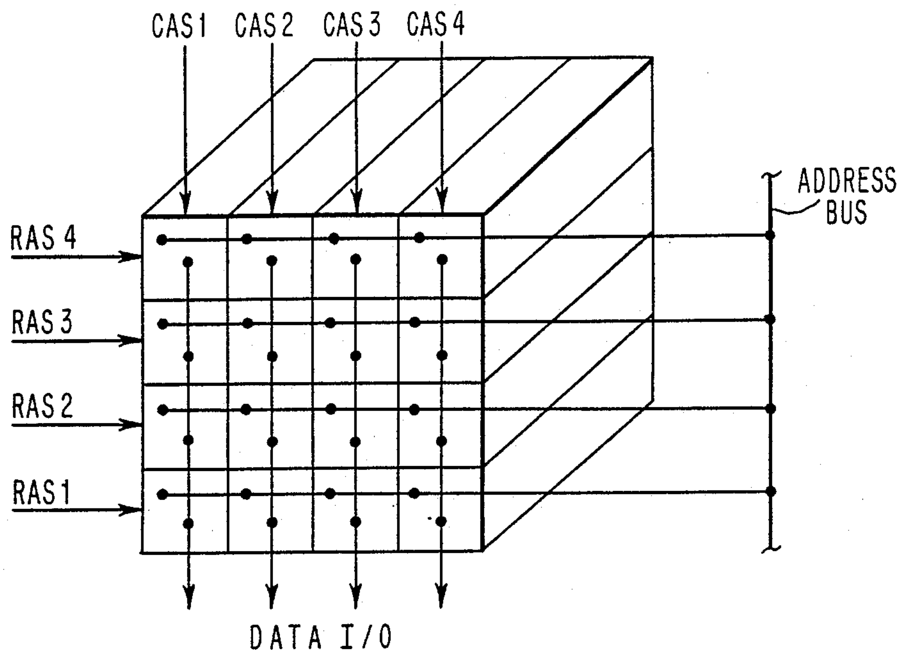
FIG. 3 is a diagram illustrating the effective address drive (strobe) and data lines for the 4 by 4 pixel array on the screen as illustrated in FIG. 2.

FIG. 3 shows signals necessary to drive such a frame buffer organization. It should be understood that each of the pixels in the figure are actually distributed throughout the 16 chips but lie along common rows and columns. An eight bit X and Y address bus is common for all memory chips. Only eight bits are necessary on chips as only 256 rows or columns need to be accessed on any chip and all of the chip address lines are interconnected in rows and columns. The data signals (input-/output) are connected in the vertical direction, forming a 32-bit data bus. This allows the access of all sixteen pixels (128 bits) if the data being written along each column is same (as is the case when clearing, area filling, or drawing vertical lines), but otherwise allows reads and writes of 4 horizontal pixels which can be any of the four rows. The four RAS signals are driven along rows such that all chips in the same row have the same row address. Similarly all chips in the same column have a common column address. Each word (of 32 bits) can be accessed by supplying four time-multiplexed 8-bit addresses onto the address bus. Two of these are row addresses and the other two are column addresses. In the case of a word aligned array only of each will be required, as will be explained subsequently. Each chip receives only one row and column address selected by one of the two row address strobes and one of the two column address strobes.

Figure 4:
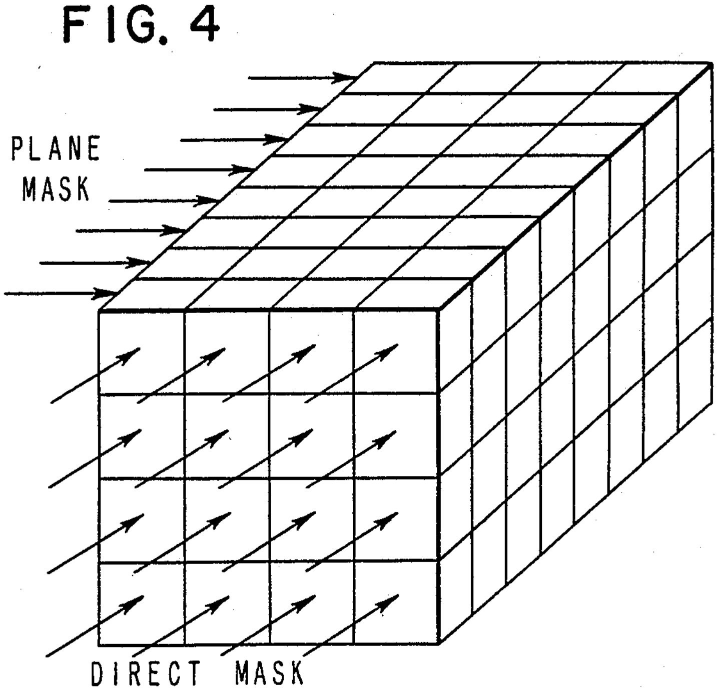
FIG. 4 illustrates a 4 by 4 by eight bit pixel segment of the frame buffer which illustrates the orientation of the direct mask and plane mask enable signals.

FIG. 4 illustrates the rest of the control signals (e.g., output and write enables), which control the ability to mask any combination of pixels and planes for the whole array. The "direct" mask controls which pixels in the square are written and is implemented by selectively controlling the write "enable" signals of all 16 chips. The plane mask controls which plane is written, and its implementation depends on the internal logic of the memory chips that are used to build the frame buffer. If, for example, NEC uPD41264 chips are used, plane mask is provided by supplying the proper data on the data bus during the row address strobe. In case of 64K by 1 chips, plane masking may be done by having 32 separate CAS signals, eight for each column and enabling only the ones where the plane is enabled.

FIGS. 5.1 and 5.2 show a correspondence between pixel locations on the screen and addresses supplied to the frame buffer for an aligned array. The cross hatched area on the screen of FIG. 5.2 shows 16 pixels, accessed simultaneously. The black painted square in each chip on FIG. 5.1 shows a cell or pixel, which would be accessed corresponding to this area. Bold lines on the screen mark word boundaries. When the pixel square is located exactly inside those boundaries, the addresses applied to all 16 memory chips are equal, the array is said to be word aligned. Thus, if the square with coordinates (4,0) of the pixel P0 is being accessed, then for all chips the row address is 0 and column address is 1.

FIGS. 6.1 and 6.2 are equivalent to FIGS. 5.1 and 5.2 but illustrate the condition of a non-word aligned array. Thus the array lies across one or more word boundaries. In the example of FIG. 6.2 the array, with the coordinates of pixel P0 being (5,1), lies in two vertical and two horizontal address spaces. This results in the distribution in the frame buffer shown in FIG. 6.1. It will be noted all sixteen pixels still lie within four columns (2,1,1,1) and four rows (1,0,0,0). The addresses received by each chip are different. These addresses are computed by the addressing circuitry is explained subsequently with respect to the example shown in FIG. 7.

Figure 7:
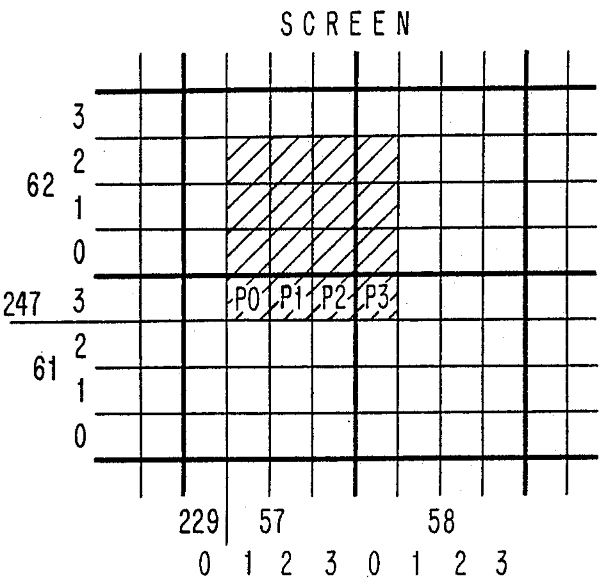
FIG. 7 is an illustration on the screen of a four by four pixel array similar to FIG. 6.2 showing a non-aligned word which is used as an example together with FIG. 8–10 to illustrate the generation of the proper row and column address strobes from the address of the reference bit PO.

FIG. 7 illustrates a selection of addresses applied to the memory chips in the situation when a pixel square is not located at the word boundaries (non-aligned). For example, if coordinates of P0 is (229,247), then pixels P0, P1, P2 should get row address 61 and column address 57, pixel P3 should get addresses 58, 61, etc. Hence, there are four pairs of addresses that must be assigned to the 16 chips.

Figure 8:
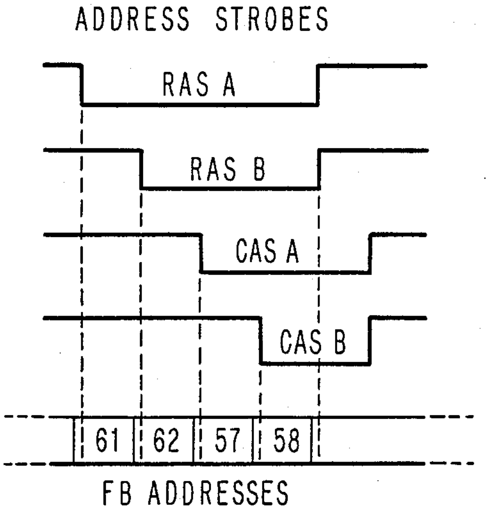
FIG. 8 comprises the set of row and column address strobes illustrating the relative timing required for addressing the four by four non-aligned pixel array illustrated in FIG. 7.
Figure 9:
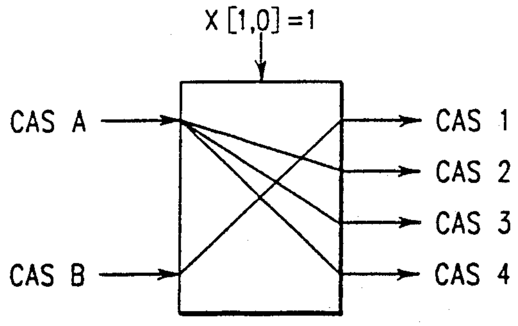
FIG. 9 illustrates the distribution of the two column address strobes of FIG. 8 performed by switch matrix SWX (FIG. 11) into the four required column address strobe signal applied directly to the memory chips as required by the example shown in FIG. 7.
Figure 10:
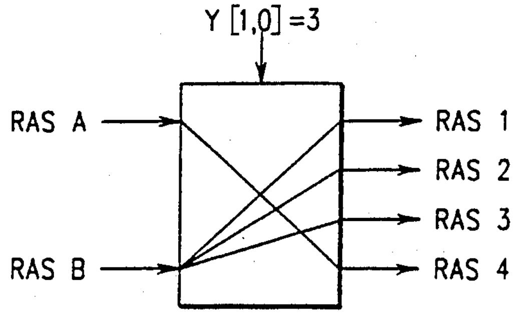
FIG. 10 similarly to FIG. 9 illustrates the distribution of the two row address strobe signals into the four strobe signals which are applied directly to the memory chips.

FIG. 8 illustrates the timing of the addresses supplied to the row and column address busses of all 16 chips with respect to the four control signals RASA, RASB, CASA and CASB. FIGS. 9 and 10 illustrate the distribution of four signals above to eight signals RAS 1-4 and CAS 1-4 for an arbitrary array, which in turn are applied directly to the rows and columns of memory chips. Thus CASA, CASB, RASA and RASB can select up to two row and column addresses in each chip. RAS 1-4 and CAS 1-4 are the actual strobe pulses applied to the address lines selected above. RAS 1 is applied to the four chips in row 1 of the array of chips in the buffer, etc., and CAS 1 is applied to the chips in column 1 of the array of chips in the buffer.

The switching logic and timing is controlled by the two last bits of X and Y addresses. So, for the above example, CASA is applied to CAS2, CAS3 and CAS4; CASB is applied to CAS 1; RASA is connected to RAS4 and RASB is connected to RAS1, RAS2 and RAS3.

Figures 11, 12:
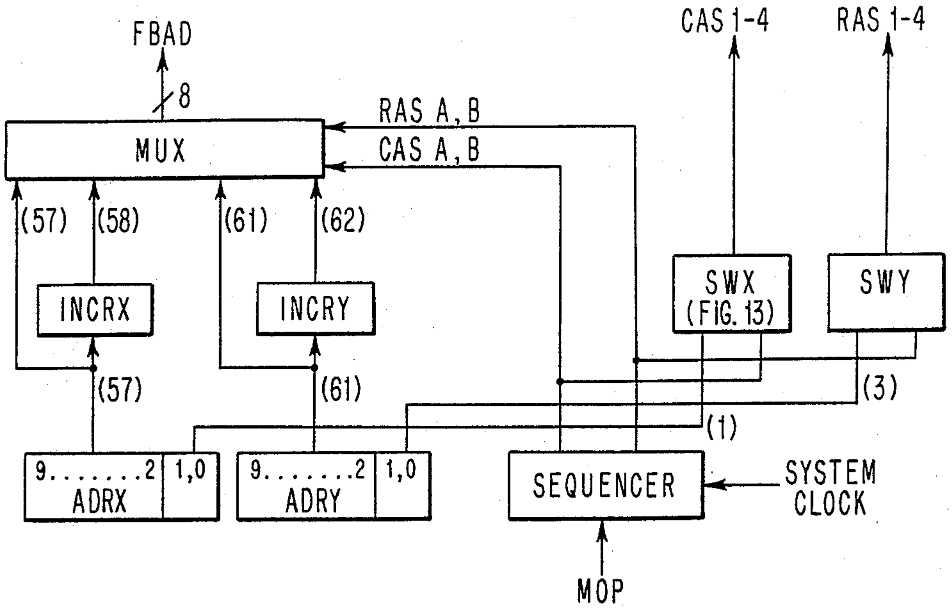
FIG. 11 comprises a functional block diagram of the frame buffer addressing and access control circuitry which generates the requisite control signals (addresses and strobes) to access arbitrary squares on the face of the screen in accordance with the present invention.
FIG. 12 is a mapping table which defines logical function of the switch SWX in FIG. 11.

FIG. 11 shows the required hardware which provides access to an arbitrary square array, based on the principle, discussed above. Two 10-bit address registers ADRX and ADRY are loaded with the coordinates of the pixel P0 (in the example ADRX=229, ADRY=247). The high order 8 bits of each address are connected to a corresponding incrementor (INCRX and INCRY) and to the four-to-one multiplexor MUX. The outputs of the incrementors are also connected to the MUX. The memory operation begins when a signal "start memory operation" (MOP) is applied to a sequencer SEQ, which in turn, provides signals RASA, RASB, CASA and CASB. The latter signals control the MUX, providing the address sequence, shown at the bottom of FIG. 8 and, in addition, feed the inputs of two functionally equal logical switches SWX and SWY. The switch SWX distributes CASA and CASB to four signals CAS1-4 under control of the two last bits of ADRX register XAD0, XAD1, and the switch SWY distributes RASA and RASB to four signals RAS1-4 under control of the two list bits of ADRY register YAD0, YAD1.

Figure 13:
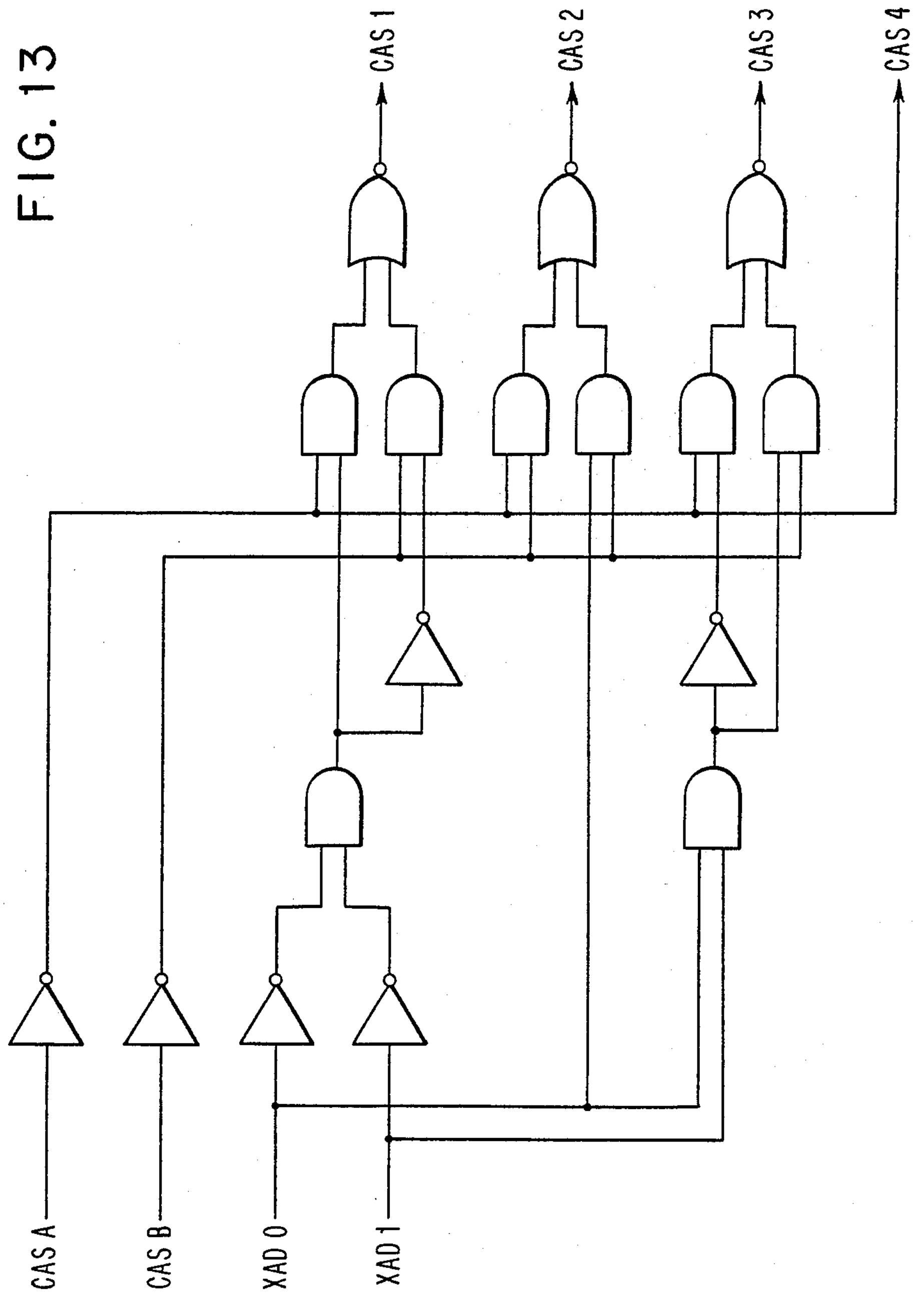
FIG. 13 is a logic diagram of one possible implementation of the switch SWX of FIG. 12.

FIG. 12 defines the logical function or truth table of the switch SWX, showing the correspondence between its input and output signals as a function of the two last bits of the X address. FIG.13 shows the possible implementation of the SWX switch according to the logic defined by Table 1. The logical function for switch SWY is not shown as it would be identical to that of the switch SWX, e.g., RAS 1-4, A and B would be substituted for CAS 1-4, A and B.

The square array illustrated in FIG. 7 would be defined by an address P0 (229, 247) which as will be appreciated on the screen coordinates of the pixel P0 (the array origin). The high order eight bits of the X address decode to 7, X(9 . . . 2)=7; the low order two bits decode to 1, X(1,0)=1; the high order eight bits of the Y address decode to 61, Y(9 . . . 2)=61; and the low order two bits decode to 3, Y(1,0)=3.

FIG. 8 indicates the addresses that will be applied to the frame buffer via the MUX of FIG. 12 during the times when CASA, CASB and RASA, RASB are active.

FIGS. 9 and 10 illustrate the distribution of the CAS 1-4 and RAS 1-4 strobe signals to the respective rows and columns of chips during address sequences CASA, CASB and RASA, RASB. The particular output configuration is determined by the two logical switches SWX and SWY and is for the example graphically shown in FIG. 7 and described above. As stated previously the logical function defining the outputs of SWX and SWY is shown in FIG. 12.

An evaluation of the above array address P0 (231,247) is shown in FIG. 11 by the parenthetical numbers below the MUX, INCRX, INCRY, SWX, and SWY.

Figure 14:
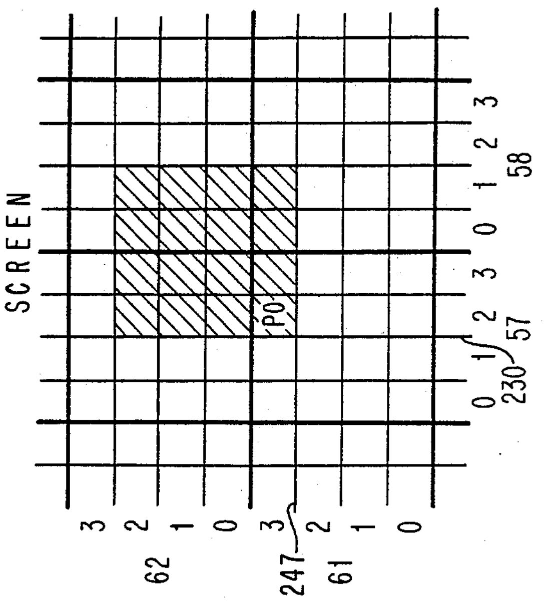
FIG. 14 comprises a similar to FIG. 7 which illustrates a non-aligned four by four pixel array on the screen for the purposes of illustrating the direct mask generation as set forth with respect to FIG. 15.
Figure 15:
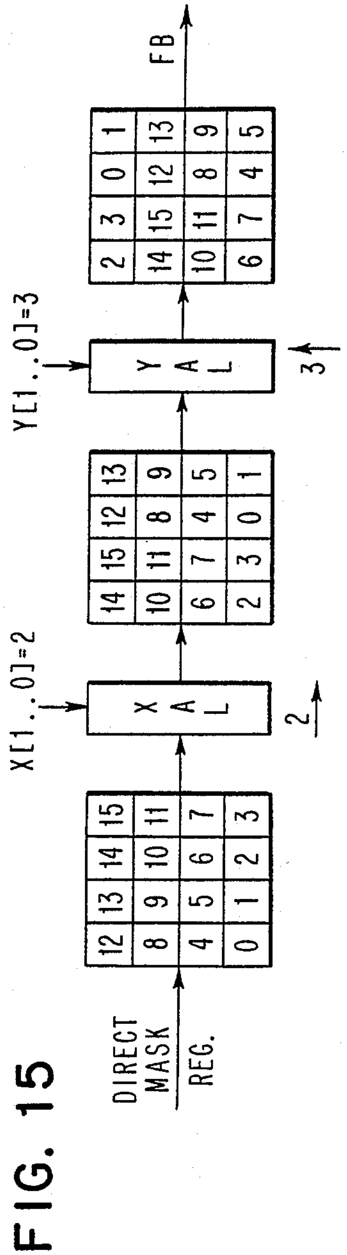
FIG. 15 illustrates diagrammatically the automatic two dimensional rotation of the direct mask under control of the x and y alignment circuits for the particular example of FIG. 14.

FIGS. 14 and 15 illustrate the direct mask alignment necessary, according to the location of the pixel square. Two aligners, one for horizontal direction (XAL) and one for vertical direction (YAL) rotate the 16-bit mask under control of the four low order X and Y address bits X<1,0> and <1,0>. Data alignment is also required, the principle of which is discussed in previously discussed U.S. Pat. No. 4.435,792, "RASTER MEMORY MANIPULATION APPARATUS", by Andreas Bechtolsheim, and need not be described here further. It should be mentioned, however, that for the frame buffer disclosed here, data alignment needs to be done for only one (horizontal) direction and requires four times less hardware.

FIG. 15 graphically illustrates the mapping performed by the two aligners XAL and YAL for the particular array shown in FIG. 14. P0 (230,247). As will be understood the mask array which selectively controls access to specified pixels in the frame buffer (FB) must be reconfigured from its original form entering the alignment module at the left to the configuration shown going to the FB at the right of the figure which is of course necessitated by the location of the particular pixels in the FB.

Figure 16:
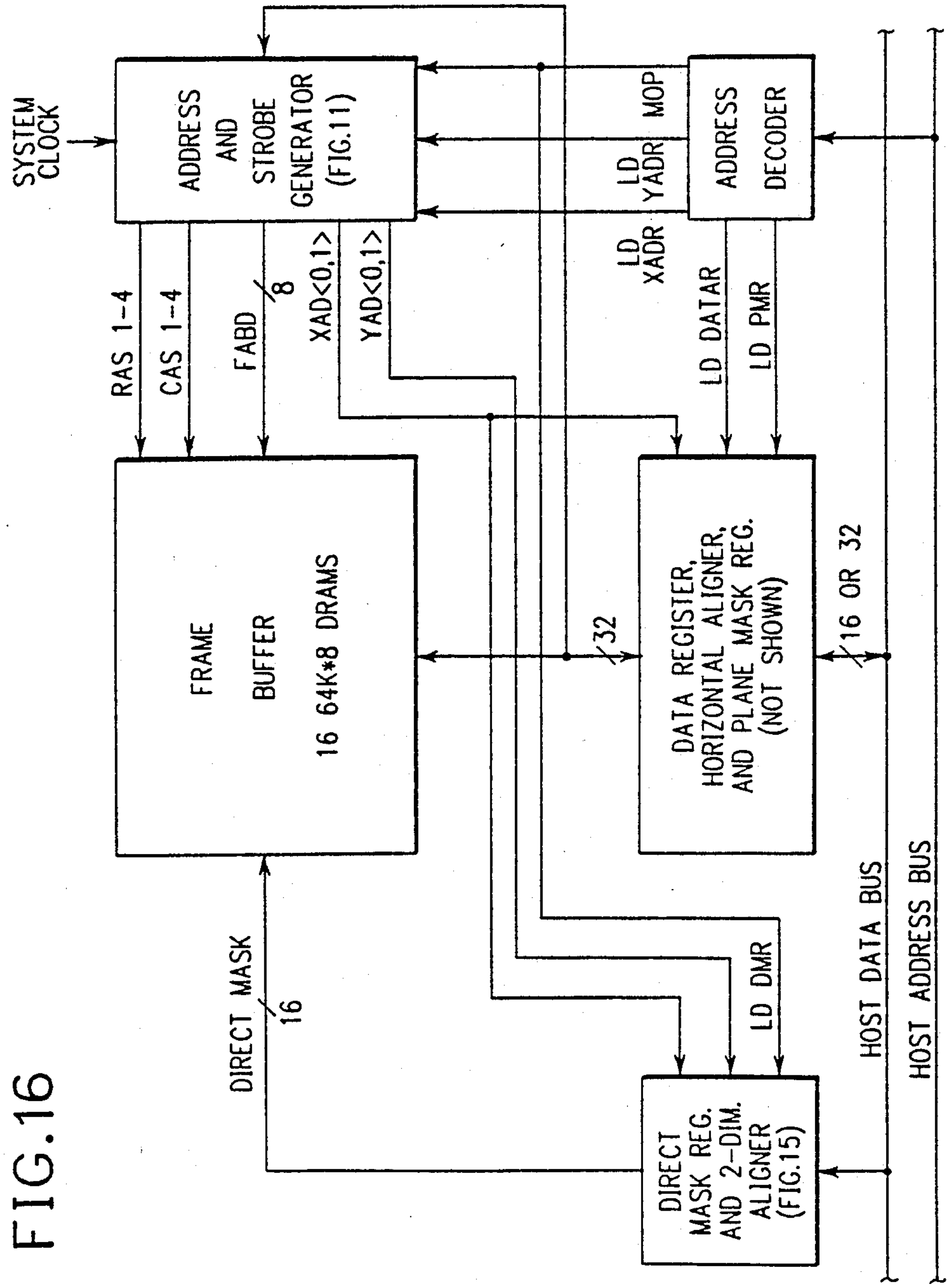
FIG. 16 is a high level block diagram illustrating the overall frame buffer architecture of the present invention.

FIG. 16 shows the overall implementation of the disclosed frame buffer. It is believed to be self explanatory, all blocks which are not essentially conventional in nature having been described.

The frame buffer organization can be further enhanced by allowing rapid successive memory cycles. This can be readily accomplished under control of a subclock, familiar to those skilled in the art, which would cause appropriate RAS and CAS strobe pulses to be applied on a shortened cycle basis. This is very useful because most successive frame buffer accesses are in the neighborhood of the previous ones. Update hardware can hence easily utilize the enhancement provided by faster update cycles that are in vicinity of previous cycles.

In the case of the disclosed frame buffer organization, reads and writes of arbitrarily aligned rows of four pixels are possible. Once one row has been accessed, it is trivial to access any of the other three rows in the accessed 4 by 4 square by merely enabling the outputs of that row of chips. The operation of the accessing of the next row is significantly faster than the access of the first row (in current memory technology 50 nanoseconds vs. 300 nanoseconds).

A slightly different technique of accessing successive words rapidly is to use page mode access provided by some memory chips. Page mode access is a mode of memory chip access such that memory locations with the same row address can be accessed in a shorter time (typically 1/6th to ⅓rd of the regular memory cycle). Neighboring 4 by 4 squares are typically located on the same row address, and can be accessed in page mode.

The technique of accessing successive words rapidly is also useful in the case of memory organizations using higher density memory chips. When one designs a frame buffer using a higher density memory organization, a square access of 16 pixels may not be feasible because of the lack of enough input/output pins on the memory chips (i.e., a 1K by 1K frame buffer requires only one 256 by 4 memory chip). In this case, one could organize the memory to access only four horizontal pixels, and use the rapid access of successive words to provide fast update. This can be readily accomplished under control of a subclock, familiar to those skilled in the art, which would cause appropriate RAS and CAS strobe pulses to be applied on a shortened cycle basis.

The plane mask feature as described previously is to effect the selecting or ignoring of certain bit fields in the individual pixels and would be the same (i.e., same bit) for a given access. Accordingly it need be only an 8 bit mask field which may be applied to the output enable lines shown schematically as the "plane mask" in FIG. 4. These lines are connected together in the vertical planes of the respective chips as will be understood.

Having thus described our invention, what we claim as new and desire to secure by Letters Patent is:

1. A frame buffer memory organization for use with a raster scan video monitor which organization is capable of accessing a pixel aligned M by N array of contiguous pixels on the screen of the monitor from a frame buffer memory constructed of an M by N array of memory chips, memory addressing and control means for driving a common address bus to all the memory chips, and for energizing selectively N row address strobe (RAS) wires across the memory chip array and M column address strobe (CAS) wires down the memory chip array, means to effect the writing of individual pixels in the array being enabled by energizing the write enable pins to each memory chip directly, means connecting the data wires in the memory organization together such that M pixels in a single row can be read or written simultaneously, means for supplying the same row and column address to all of the memory sections when address decoding means determine that the accessed M by N array lies along a physical word address boundary on said screen and in said memory whereby the pixel accessed from each section of the memory is at the same address in each section, or alternatively, means for sequentially supplying within a memory access cycle, two consecutive sets of row and column addresses to said memory and means including clock means for selectively energizing a first set of RAS and CAS wires during a first phase and a second set of RAS and CAS wires during a second phase of the memory access cycle wherein a total of N rows and M columns of address strobe wires are energized during a given memory access cycle, when said address decoding means determine that the accessed M by N array does not lie along a physical word address boundary, and means for generating an M by N direct mask for controlling the access to specified pixels of an accessed M by N array during a particular frame buffer cycle said mask comprising a configuration of "1's" and "0's" depending on which pixel(s) is to be accessed, said generating means including, a register for storing said direct mask, first rotation means operable in response to an X-offset signal cooperable with the direct mask register for rotating the mask in the X direction an amount equal to the offset of the array origin address (P0) from a physical word boundary along the X axis and second rotation means operable in response to a Y-offset signal cooperable with said direct mask register for rotating the mask in the Y direction an amount equal to the offset of the array origin address from a physical word boundary along the Y axis, and wherein means for determining the X and Y offset values comprises an address decoder which decodes the low order bits of the X and Y addresses defining the array origin (P0) to determine the pixel offset of the array origin, if any, from a physical word boundary.

2. A frame buffer memory organization as set forth in claim 1 wherein write enable lines and data registers for the memory are configured so that a single row or column of memory locations, can be written in a single memory cycle and, means for energizing successive write enable lines for the successive rows or columns of an accessed array at a speed whereby the resultant write cycle is much less than a normal memory write cycle when an accessed instruction indicates that the same data pattern is to be written into each successive row or column.

* * * * *